United States Patent
Ohara

(10) Patent No.: US 11,818,771 B2
(45) Date of Patent: Nov. 14, 2023

(54) USER EQUIPMENT AND COMMUNICATION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/441,523

(22) PCT Filed: Mar. 28, 2019

(86) PCT No.: PCT/JP2019/013901
§ 371 (c)(1),
(2) Date: Sep. 21, 2021

(87) PCT Pub. No.: WO2020/194758
PCT Pub. Date: Oct. 1, 2020

(65) Prior Publication Data
US 2022/0174749 A1    Jun. 2, 2022

(51) Int. Cl.
*H04W 74/08*    (2009.01)
*H04W 52/36*    (2009.01)

(52) U.S. Cl.
CPC ....... *H04W 74/0841* (2013.01); *H04W 52/36* (2013.01)

(58) Field of Classification Search
CPC ........ H04B 1/7183; H04B 2201/71634; H04B 17/364; H04W 56/0045; H04W 56/009; H04W 56/00; H04W 4/02; H04W 4/40; H04W 52/36; H04W 74/0841; H04W 52/146; H04W 52/50; H04W 74/0833;
(Continued)

(56) References Cited

U.S. PATENT DOCUMENTS

2011/0075636 A1 * 3/2011 Blomgren ......... H04W 72/1268
370/336
2016/0278130 A1    9/2016 Uchino et al.
(Continued)

FOREIGN PATENT DOCUMENTS

JP    2017-530654 A    10/2017
WO    2015/064515 A1    5/2015
(Continued)

OTHER PUBLICATIONS

International Search Report issued in PCT/JP2019/013901 dated May 14, 2019 (5 pages).
(Continued)

*Primary Examiner* — Nathan S Taylor
(74) *Attorney, Agent, or Firm* — Osha Bergman Watanabe & Burton LLP

(57) ABSTRACT

A user equipment includes a transmitting unit configured to transmit first data in a first step of a 2-step RACH; and a receiving unit configured to receive second data in a second step of the 2-step RACH. The user equipment performs fallback to a 4-step RACH at the time of retransmission of the first data. In addition, provided is a user equipment including: a transmitting unit configured to transmit first data in a first step of a 2-step RACH; and a receiving unit configured to receive second data in a second step of the 2-step RACH. The user equipment performs fallback to a 4-step RACH according to the received second data.

6 Claims, 5 Drawing Sheets

(58) Field of Classification Search
CPC ..... H04W 74/08; H04W 52/04; H04W 52/14; G01S 11/02; G01S 13/74; G01S 13/76; B60R 25/00

See application file for complete search history.

(56) References Cited

U.S. PATENT DOCUMENTS

| | | | |
|---|---|---|---|
| 2017/0013610 A1* | 1/2017 | Lee | H04L 1/00 |
| 2018/0376428 A1* | 12/2018 | Lin | H04W 52/146 |
| 2019/0313451 A1 | 10/2019 | Liu et al. | |
| 2020/0045650 A1* | 2/2020 | Suzuki | H04W 52/36 |
| 2020/0107235 A1* | 4/2020 | Peisa | H04B 7/0695 |
| 2020/0107369 A1* | 4/2020 | Jeon | H04W 72/14 |
| 2020/0146069 A1* | 5/2020 | Chen | H04B 17/327 |
| 2020/0252974 A1* | 8/2020 | Akkarakaran | H04W 52/36 |
| 2020/0314913 A1* | 10/2020 | Rastegardoost | H04W 74/006 |
| 2020/0344812 A1* | 10/2020 | Agiwal | H04W 74/0833 |
| 2020/0351801 A1* | 11/2020 | Jeon | H04W 52/48 |
| 2021/0329703 A1* | 10/2021 | Yang | H04L 5/001 |
| 2022/0070941 A1* | 3/2022 | Farag | H04W 74/006 |
| 2022/0190906 A1* | 6/2022 | Haghighat | H04W 74/0841 |

FOREIGN PATENT DOCUMENTS

| | | |
|---|---|---|
| WO | 2018/070087 A1 | 4/2018 |
| WO | 2018151230 A1 | 8/2018 |

OTHER PUBLICATIONS

Written Opinion of the International Searching Authority issued in PCT/JP2019/013901 dated May 14, 2019 (4 pages).

Sony; "Discussion on Procedure for 2-step RACH"; 3GPP TSG RAN WG1 #96, R1-1902166; Athens, Greece, Feb. 25-Mar. 1, 2019 (3 pages).

3GPP TS 38.300 V15.0.0; "3rd Generation Partnership Project; Technical Specification Group Radio Access Network; NR; NR and NG-RAN Overall Description; Stage 2 (Release 15)"; Dec. 2017 (68 pages).

Office Action in the counterpart Chinese Application No. 201980094246.0, dated Aug. 31, 2023 (17 pages).

* cited by examiner

USER EQUIPMENT AND COMMUNICATION METHOD

TECHNICAL FIELD

The present invention relates to a user equipment and a communication method in a radio communication system.

BACKGROUND ART

In 3rd generation partnership project (3GPP), in order to achieve a higher system capacity, a higher data transmission rate, a lower latency in a radio section, and the like, a radio communication system called new radio (NR) or 5G has been discussed (for example, Non-Patent Document 1). In the NR, in order to satisfy requirements including a latency in a radio section of 1 ms or less and a throughput of 10 Gbps or more, various radio technologies have been studied.

In contrast to conventional 4-step RACH, in which a contention-based random access procedure is performed in four steps, in the NR, a 2-step RACH, in which the contention-based random access is performed in two steps, has been discussed. It is expected that the 2-step RACH has good effects on low latency, power consumption reduction, and the like.

In the 4-step RACH of the contention-based random access procedure, in a first step, a message Msg1 (preamble) is transmitted from user equipment 20 to a base station apparatus 10; in a second step, a message Msg2 (random access response (RAR) is transmitted from the base station apparatus 10 to the user equipment 20; in a third step, a message Msg3 is transmitted from the user equipment 20 to the base station apparatus 10; and in a fourth step, a message Msg4 is transmitted from base station apparatus 10 to user equipment 20. The message Msg3 corresponds to a physical uplink shared channel (PUSCH).

CITATION LIST

Non-Patent Document

Non-Patent Document 1: 3GPP TS 38.300 V15.0.0 (2017 December)

SUMMARY OF THE INVENTION

Problem to be Solved by the Invention

Similar to the case of the 4-step RACH, it is assumed that retransmission of the messages is performed also in the 2-step RACH. In addition, it is assumed that fallback to the 4-step RACH is performed at the time of retransmission in the 2-step RACH. However, operations in these cases are unclear (not explicitly defined).

The invention has been made in view of the above-described points, and the invention is to provide a technology capable of reducing latency by a 2-step RACH by appropriately defining operations of retransmission in the 2-step RACH and increasing the success rate of random access even in a poor communication environment.

Means for Solving Problem

According to the disclosed technology, there is provided a user equipment including: a transmitting unit configured to transmit first data in a first step of a 2-step RACH; and a receiving unit configured to receive second data in a second step of the 2-step RACH, wherein the user equipment performs fallback to a 4-step RACH at the time of retransmission of the first data.

According to another aspect of the disclosed technology, there is provided a user equipment including: a transmitting unit configured to transmit first data in a first step of a 2-step RACH; and a receiving unit configured to receive second data in a second step of the 2-step RACH, wherein the user equipment performs fallback to a 4-step RACH according to the received second data.

Effect of the Invention

According to the disclosed technology, there is provided a technology capable of reducing latency by a 2-step RACH and increasing a success rate of random access even in a bad communication environment.

MODE(S) FOR CARRYING OUT THE INVENTION

Hereinafter, embodiments (the present embodiments) of the invention will be described with reference to the drawings. In addition, the embodiments described below are exemplary ones, and the embodiments to which the invention is applied are not limited to the following embodiments.

Although it is assumed that the radio communication system in the following embodiments basically conforms to the NR, this is only an example, and the radio communication system according to the present embodiment may partially or entirely includes a radio communication system (for example, LTE) other than the NR.

Overall System Configuration

Figure 1:
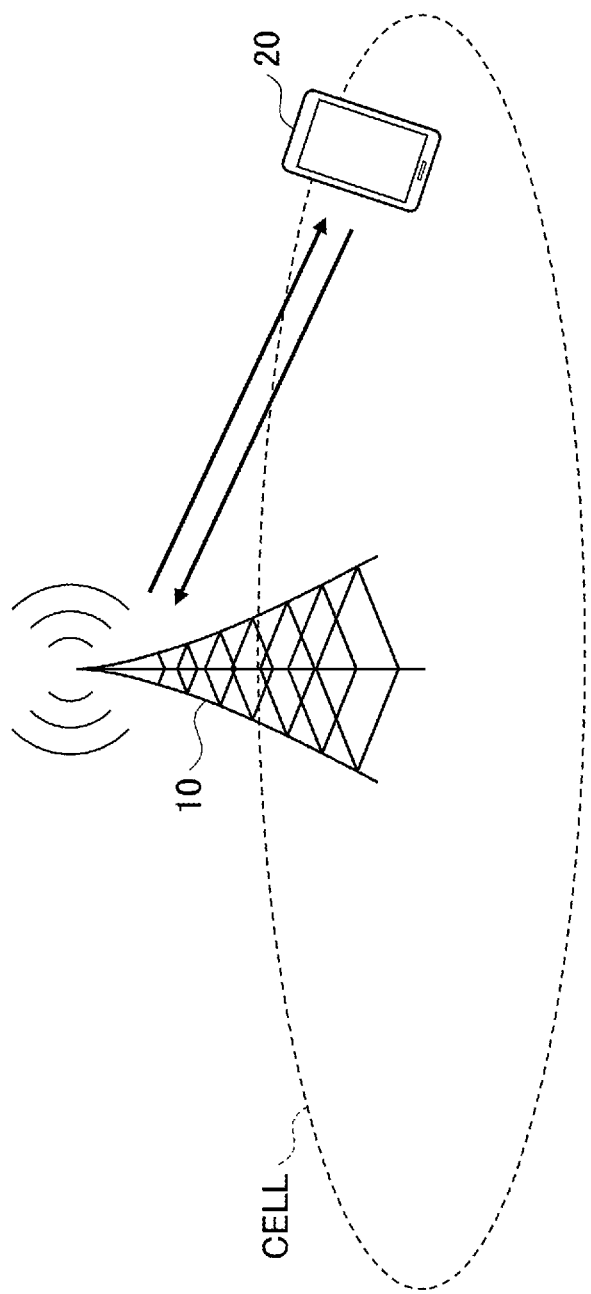
FIG. 1 is a configuration diagram of the communication system according to an embodiment of the invention.

FIG. 1 illustrates the configuration diagram of a radio communication system according to the present embodiment. As illustrated in FIG. 1, the radio communication system according to the present embodiment includes a base station apparatus 10 and a user equipment 20. FIG. 1 illustrates one base station apparatus 10 and one user equipment 20, but this is an example, and a plurality of base station apparatus and a plurality of the user equipment may be provided.

The user equipment 20 is a communication device having a radio communication function such as a smart phone, a mobile phone, a tablet, a wearable terminal, or a communication module for machine-to-machine (M2M), and the user equipment is connected to the base station apparatus 10 in a wireless manner to use various communication services provided by the radio communication system. The base station apparatus 10 is a communication device that provides one or more cells and communicates with the user equipment 20 in a wireless manner. Both the user equipment 20 and the base station apparatus 10 can transmit and receive signals by performing beamforming. In addition, the user equipment 20 may be referred to as a UE, and the base station apparatus 10 may be referred to as a gNB.

In the present embodiment, the duplexing method may be time division duplexing (TDD) or may be frequency division duplexing (FDD).

Because the technology according to the present embodiment relates to a contention-based random access procedure of NR, first, an operation example of a 4-step RACH of the contention-based random access procedure and an operation example of a 2-step RACH of the contention-based random access procedure will be described.

Contention-Based Random Access Procedure: 4-Step RACH

Figure 2:
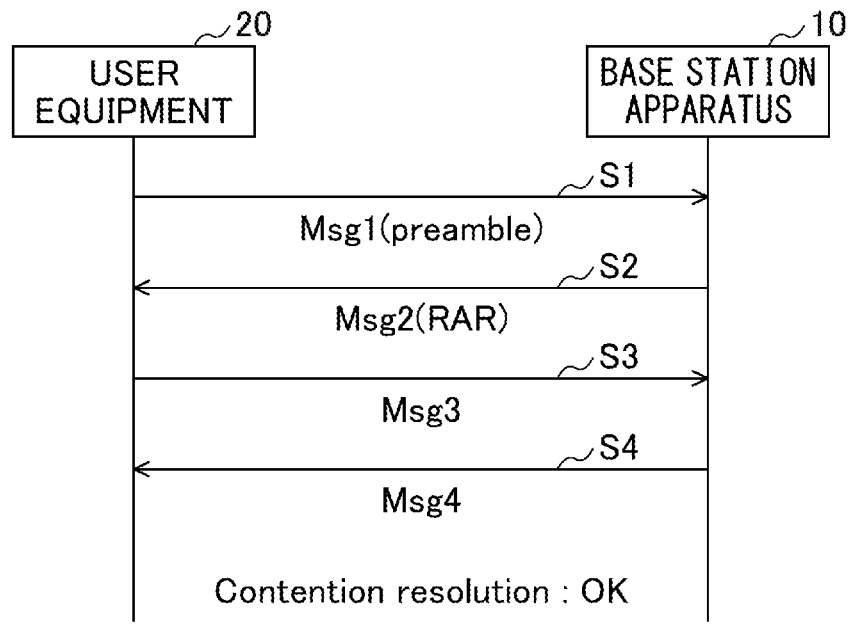
FIG. 2 is a diagram illustrating a 4-step RACH of a contention-based random access procedure.

FIG. 2 is a diagram illustrating the 4-step RACH of the contention-based random access procedure.

The user equipment 20 transmits a message Msg1 (=preamble) in a first step (S1).

Upon detecting the preamble, the base station apparatus 10 transmits a message Msg2 (=random access response (RAR))) as a response to the user equipment 20 in a second step (S2).

In a third step (S3), the user equipment 20, having received the RAR, transmits a message Msg3 that includes predetermined information to the base station apparatus 10. The Msg3 is, for example, an RRC connection request.

In a fourth step (S4), the base station apparatus 10, having received the Msg3, transmits a message Msg4 (for example, RRC connection setup) to the user equipment 20. When confirming that the predetermined information is included in the Msg4, the user equipment 20 recognizes that the Msg4 is an Msg4 addressed to the user equipment itself in response to the Msg3 and completes the random access procedure, so that the RRC connection is established (contention resolution: OK).

Contention-Based Random Access Procedure: 2-Step RACH

Figure 3:
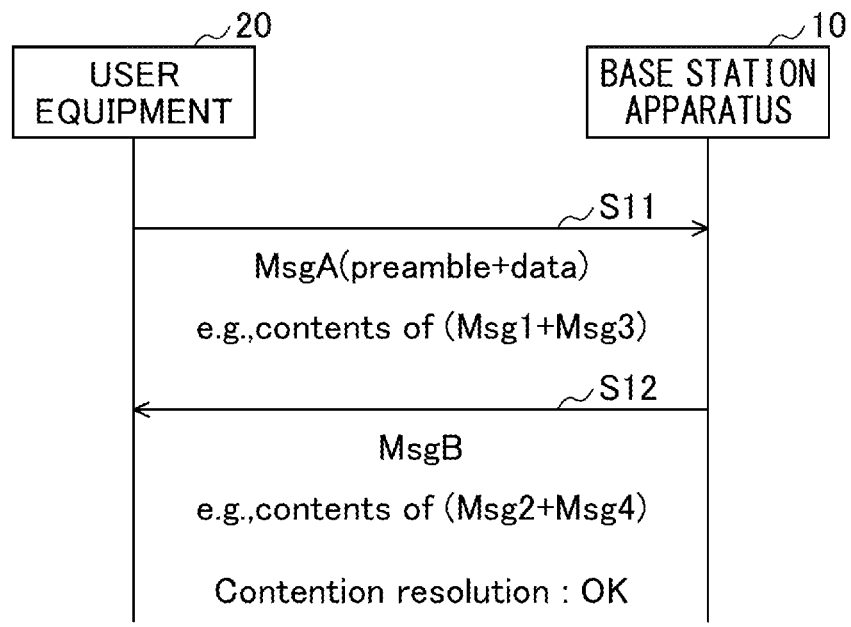
FIG. 3 is a diagram illustrating a 2-step RACH of a contention-based random access procedure.

FIG. 3 is a diagram illustrating the 2-step RACH of the contention-based random access procedure.

As illustrated in FIG. 3, in the 2-step RACH of the contention-based random access procedure, in a first step (S11), a message MsgA is transmitted from the user equipment 20 to the base station apparatus 10; and in a second step (S12), a message MsgB is transmitted from the base station apparatus 10 to the user equipment 20. When confirming that the predetermined information is included in the MsgB, the user equipment 20 recognizes that the MsgB is an MsgB addressed to the user equipment itself in response to the MsgA and completes the random access procedure, so that the RRC connection is established (contention resolution: OK).

The message MsgA includes preamble+data (PUSCH) and corresponds to Msg1+Msg3 of the 4-step RACH. In addition, the message MsgB corresponds to Msg2+Msg4 of the 4-step RACH.

Operation of Retransmission in 2-Step RACH

The operation of the retransmission in the 2-step RACH of the user equipment 20 will be described.

As an operation of the retransmission of the user equipment 20 in the 2-step RACH, it is assumed that fallback to the 4-step RACH is performed at the time of retransmission of the message MsgA in the 2-step RACH.

In the case of fallback to the 4-step RACH at the time of retransmission of the message MsgA in the 2-step RACH, the user equipment 20 may start from the transmission of the preamble (Msg1) of the 4-step RACH or may start from the transmission of the Msg3.

The user equipment 20 may determine, based on the information indicated by the base station apparatus 10, whether to start from the transmission of the Msg1 or to start from the transmission of the Msg3. For example, in the case of being capable of determining based on the information from the base station apparatus 10 that indicates that the reception of the preamble corresponding to the preamble ID transmitted by the user equipment 20 has succeeded, and that the reception of the PUSCH (corresponding to the Msg3) corresponding to the UE ID transmitted by the user equipment 20 has failed, the user equipment 20 may start from the transmission of the Msg3. For example, in the case of being capable of making determination based on the information from the base station apparatus 10 indicating that the reception of the preamble corresponding to the preamble ID transmitted by the user equipment 20 has failed, and the reception of the PUSCH (corresponding to the Msg3) corresponding to the UE ID transmitted by the user equipment 20 has also failed, the user equipment 20 may start from the transmission of the preamble (Msg1). In addition, the determination may be made based on other indication information.

As an operation of the retransmission of the user equipment 20 in the 2-step RACH, in the case of being capable of determining based on the information that indicates that the reception of the preamble from the base station apparatus 10 corresponding to the preamble ID transmitted by the user equipment 20 has succeeded, and that the reception of the PUSCH (corresponding to the Msg3) corresponding to the UE ID transmitted by the user equipment 20 has failed, the user equipment 20 may use the reception of the information as a trigger to perform fallback to the 4-step RACH and may start from the transmission of the Msg3.

A threshold value, for the user equipment 20 to determine whether fallback to the 4-step RACH is to be performed at the time of retransmission of the MsgA in the 2-step RACH, may be indicated or specified. For example, the number of retransmissions before the fallback to the 4-step RACH may be specified. In a case where the number of retransmissions is specified, the 2-step RACH is continued during the specified number of retransmissions; and in a case where retransmission exceeding the specified number of retransmissions becomes necessary, fallback to the 4-step RACH is performed, and the retransmission is performed from the preamble (Msg1) or the Msg3.

Power Ramping of MsgA in 2-step RACH

The power ramping of the MsgA in the 2-step RACH will be described.

With respect to the value of the power ramping step, one common value may be used for the preamble of the MsgA and the PUSCH of the MsgA.

Alternatively, with respect to the value of the power ramping step, different values may be indicated for the preamble of the MsgA and the PUSCH of the MsgA, respectively.

Alternatively, with respect to the value of the power ramping step, the value may be used only for calculating the transmission power of the preamble of the MsgA. In this case, the transmission power of the PUSCH of the MsgA may be calculated by a different method. The transmission power of the PUSCH of the MsgA may be calculated independently of the transmission power of the preamble of the MsgA or may be calculated relatively by using an offset value or the like from the transmission power of the preamble of the MsgA.

As the value of the power ramping step of the MsgA used in the 2-step RACH, a value that is the same as or a value that is different from, the value used (indicated) in the 4-step RACH may be used.

The value of the power ramping step for the preamble of the 4-step RACH may be the same as the value of the power ramping step for the preamble of the MsgA of the 2-step RACH.

Alternatively, the value of the power ramping step for the preamble of the 4-step RACH may be the same as the value of the power ramping step for the preamble and the PUSCH of the MsgA of the 2-step RACH.

Alternatively, the value of the power ramping step for the preamble of the 4-step RACH may be different from the value of the power ramping step for the preamble and the PUSCH of the MsgA of the 2-step RACH.

Figure 4:
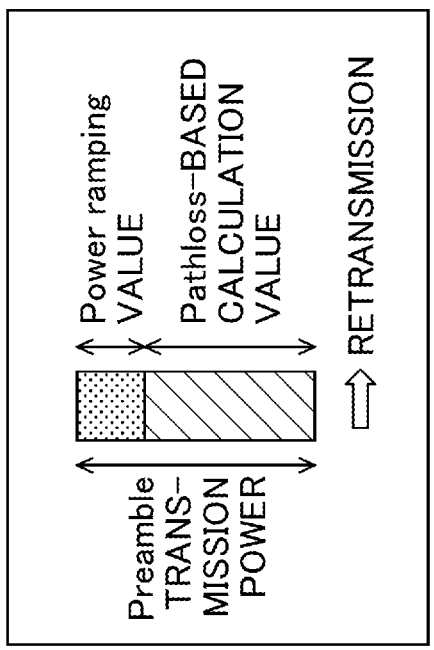
FIG. 4 is a diagram illustrating power ramping in a case where fallback from a 2-step RACH to a 4-step RACH is performed.

FIG. 4 is a diagram illustrating power ramping in a case where the fallback from the 2-step RACH to the 4-step RACH is performed.

In a case where the fallback from the 2-step RACH to the 4-step RACH is performed, the value accumulated every time the power ramping is performed may be retained after the fallback. That is, in a case where the fallback from the 2-step RACH to the 4-step RACH is performed, the power ramping counter may be retained after the fallback. The retained power ramping counter is subsequently used to calculate the transmission power of the preamble after the fallback.

As a method of retaining the power ramping counter, the value of the power ramping counter may be increased by 1 at the time of retransmission immediately after the fallback is performed (refer to Alt1-1 in FIG. 4).

As a method for retaining the power ramping counter, the value of the power ramping counter may be maintained at the time of retransmission immediately after the fallback is performed (refer to Alt1-2 in FIG. 4).

In a case where the fallback from the 2-step RACH to the 4-step RACH is performed, the value accumulated every time the power ramping is performed may be reset after the fallback. That is, the power ramping counter may be reset after the fallback. Alternatively, the power ramping counter for the 4-step RACH and the power ramping counter for the 2-step RACH may be different. In this case, at the time of preamble transmission after the fallback, the transmission power is calculated in a state where the power ramping is not performed (refer to Alt2 in FIG. 4).

Maximum Number of Retransmissions of MsgA in 2-Step RACH

With respect to the value of the maximum number retransmissions of the MsgA in the 2-step RACH, one common value may be used for the preamble of the MsgA and the PUSCH of the MsgA.

Alternatively, with respect to the value of the maximum number of retransmissions of the MsgA in the 2-step RACH, different values may be indicated for the preamble of the MsgA and the PUSCH of the MsgA.

Alternatively, the value of the maximum number of retransmissions of the MsgA in the 2-step RACH may be applied only to the preamble of the MsgA.

With respect to the counter for the number of transmissions of the MsgA (that is, the counter used to determine whether the maximum number of retransmissions has been exceeded), the number of transmissions may be counted only at the time of transmission of the preamble of the MsgA.

Alternatively, the number of transmissions may be counted at the time of transmission of the preamble of the MsgA and at the time of retransmission of only the PUSCH of the MsgA (that is, when the preamble of the MsgA is not retransmitted and only the PUSCH of the MsgA is retransmitted).

Alternatively, the number of transmissions of the preamble of the MsgA and the number of transmissions of the PUSCH of the MsgA may be counted by separate counters.

The value of the maximum number of retransmissions of the MsgA in the 2-step RACH may be a value that is the same as or different from the value used (indicated) for the 4-step RACH.

The value of the maximum number of retransmissions for the preamble of the 4-step RACH may be the same as the value of the maximum number of retransmissions for the preamble of the MsgA of the 2-step RACH.

Alternatively, the value of the maximum number of retransmissions for the preamble of the 4-step RACH may be the same as the value of the maximum number of retransmissions for the preamble of the MsgA and for the PUSCH of the MsgA of the 2-step RACH.

Alternatively, the value of the maximum number of retransmissions for the preamble of the 4-step RACH may be different from the value of the maximum number of retransmissions for the preamble of the MsgA of the 2-step RACH and also different from the value of the maximum number of retransmissions for the PUSCH of the MsgA.

With respect to the value of the number of transmissions in a case where the fallback from the 2-step RACH to the 4-step RACH is performed, the value of the number of transmissions accumulated every time the transmission is performed may be retained after the fallback. That is, the counter for the number of transmissions may be retained after the fallback. The retained value of the counter for the number of transmissions is subsequently used to determine whether the maximum number of retransmissions after the fallback has been exceeded.

As a method of retaining the counter for the number of transmissions after the fallback, the counter for the number of transmissions may be increased by 1 at the time of retransmission immediately after the fallback is performed.

Alternatively, as a method of retaining the counter for the number of transmissions after the fallback, the counter for the number of transmissions may be maintained at the time of retransmission immediately after the fallback is performed.

With respect to the value of the number of transmissions in a case where the fallback is performed from the 2-step RACH to the 4-step RACH, the value of the number of transmissions may be reset after the fallback. That is, the counter for the number of transmissions may be reset after the fallback. Alternatively, the counter for the number of transmissions for the 4-step RACH and the counter for the number of transmissions for the 2-step RACH may be different. In these cases, the reset counters of the number of transmissions or the individual counters of the number of transmissions are used to determine whether the maximum number of retransmissions after the fallback is exceeded.

Apparatus Configuration

Next, an example of a functional configuration of the base station apparatus 10 and the user equipment 20 that execute the processes and operations described above will be described. The base station apparatus 10 and the user equipment 20 include functions implementing the above-described embodiment. However, each of the base station apparatus 10 and the user equipment 20 may include only a portion of the functions in the embodiment.

Base Station Apparatus 10

Figure 5:
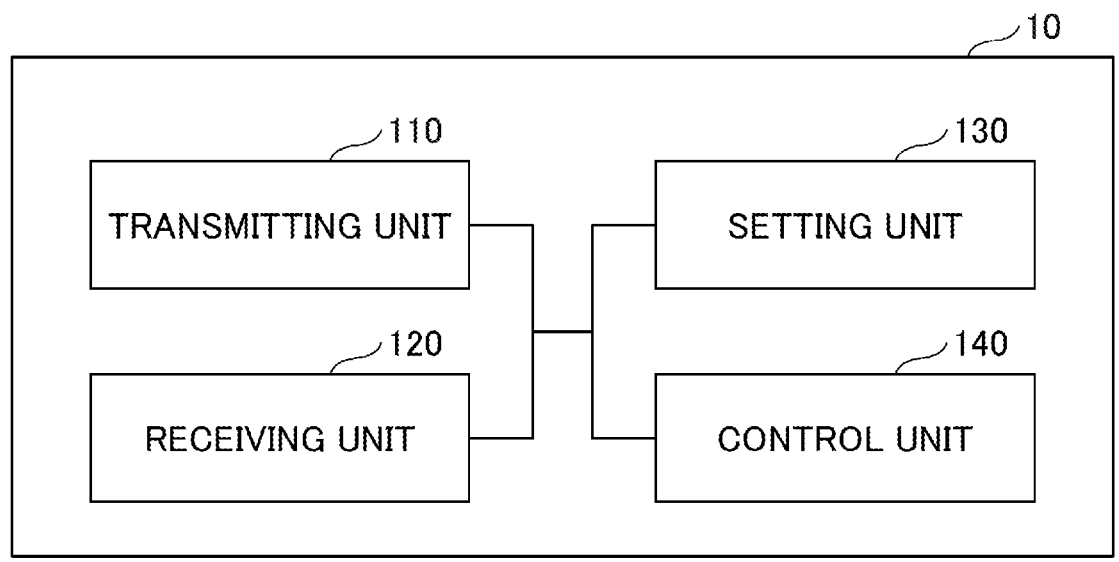
FIG. 5 is a diagram illustrating an example of the functional configuration of a base station apparatus 10.

FIG. 5 is a diagram illustrating an example of a functional configuration of the base station apparatus 10. As illustrated in FIG. 5, the base station apparatus 10 includes a transmitting unit 110, a receiving unit 120, a setting unit 130, and a control unit 140. The functional configuration illustrated in FIG. 5 is only an example. As long as the operations according to the embodiment of the invention can be executed, the name of the functional division and functional units may be any type.

The transmitting unit 110 includes a function of generating signals to be transmitted to the user equipment 20 side and transmitting the signal in a wireless manner. The receiving unit 120 includes a function of receiving various signals transmitted from the user equipment 20 and acquiring, for example, information of a higher layer from the received signal. For example, the receiving unit 120 receives the message MsgA in the 2-step RACH from the user equipment 20, and the transmitting unit 110 transmits the message MsgB in the 2-step RACH to the user equipment 20.

The setting unit 130 stores the setting information that is set in advance and various pieces of the setting information to be transmitted to the user equipment 20 in a storage device and reads the setting information from the storage device as required.

In the control unit 140, the functional units related to the signal transmission in the control unit 140 may be included in the transmitting unit 110, and the functional units related to the signal reception in the control unit 140 may be included in the receiving unit 120.

User Equipment 20

Figure 6:
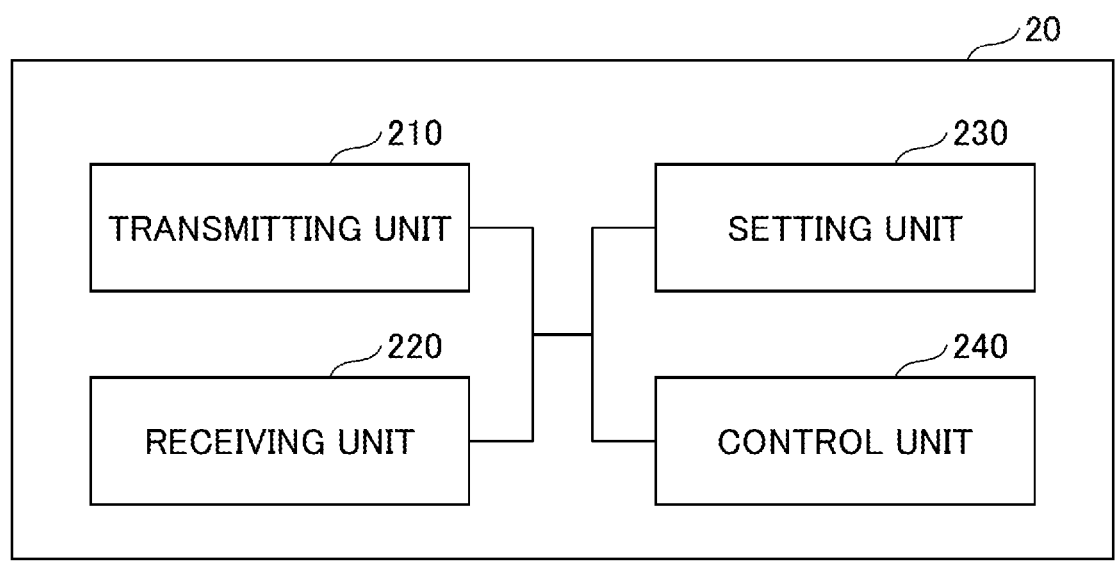
FIG. 6 is a diagram illustrating an example of the functional configuration of a user equipment 20.

FIG. 6 is a diagram illustrating an example of a functional configuration of the user equipment 20. As illustrated in FIG. 6, the user equipment 20 includes a transmitting unit 210, a receiving unit 220, a setting unit 230, and a control unit 240. The functional configuration illustrated in FIG. 6 is only an example. As long as it can perform the operation according to the embodiment of the invention, the name of the function division and functional units may be any type.

The transmitting unit 210 generates a transmission signal from the transmission data and transmits the transmission signal in a wireless manner. The receiving unit 220 receives various signals in a wireless manner and acquires a signal of a higher layer from the received signals of a physical layer. For example, the transmitting unit 210 transmits the message MsgA in the 2-step RACH to the base station apparatus 10, and the receiving unit 220 receives the message MsgB in the 2-step RACH from the base station apparatus 10.

The setting unit 230 stores various pieces of the setting information received from the base station apparatus 10 by the receiving unit 220 in the storage device and reads the setting information from the storage device as required. In addition, the setting unit 230 also stores the setting information that is set in advance.

In the control unit 240, a functional unit related to the signal transmission in the control unit 240 may be included in the transmitting unit 210, and a functional unit related to the signal reception in the control unit 240 may be included in the receiving unit 220.

Hardware Configuration

The functional configuration diagrams (FIGS. 5 and 6) used in the description of the embodiments of the invention described above illustrate blocks of functional units. These functional blocks (components) are implemented by arbitrary combinations of hardware and/or software. In addition, the means for realizing each functional block are not particularly limited. That is, each functional block may be implemented by a single apparatus obtained by physically and/or logically coupling a plurality of elements or may be realized by a plurality of apparatuses obtained by connecting directly and/or indirectly (for example, in wired and/or wireless manners) two or more apparatuses physically and/or logically separated.

Figure 7:
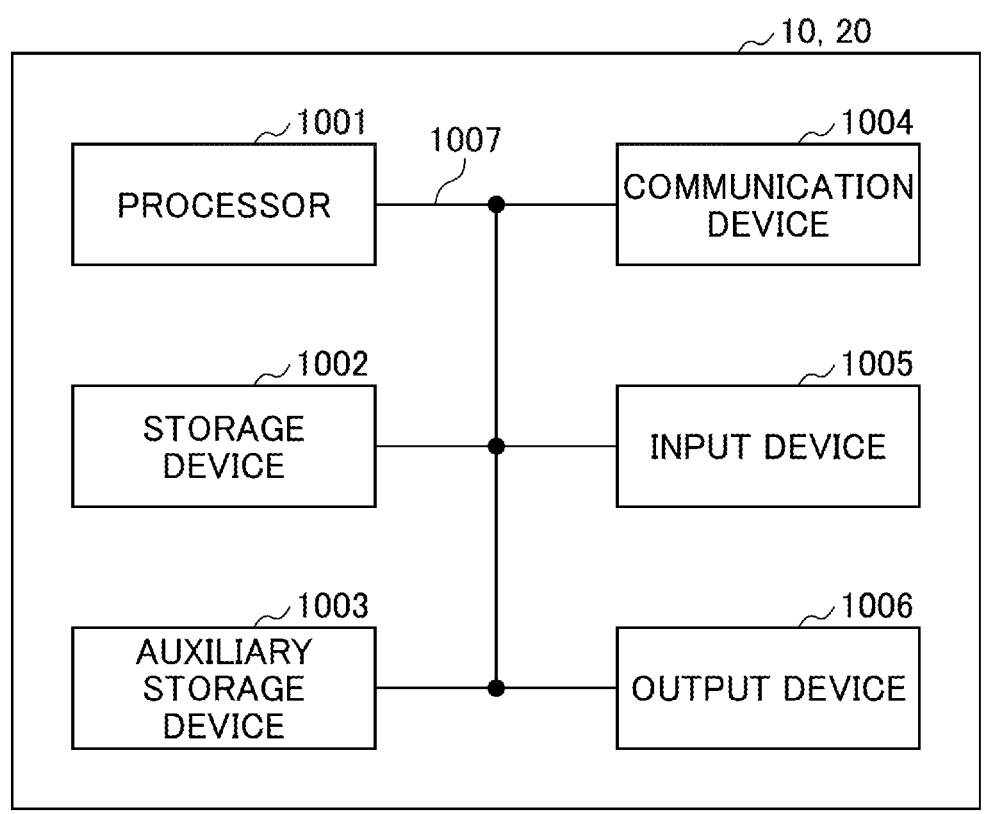
FIG. 7 is a diagram illustrating an example of the hardware configuration of a base station apparatus 10 and a user equipment 20.

In addition, for example, both the base station apparatus 10 and the user equipment 20 according to the embodiment of the invention may function as a computer for performing processing according to the embodiment of the invention. FIG. 7 is a diagram illustrating an example of a hardware configuration of the radio communication device that is the base station apparatus 10 or the user equipment 20 according to the embodiment of the invention. Each of the above-described base station apparatus 10 and user equipment 20 may be configured physically as a computer device including a processor 1001, a storage device 1002, an auxiliary storage device 1003, a communication device 1004, an input device 1005, an output device 1006, a bus 1007, and the like.

In addition, in the following description, the term "apparatus" can be replaced with circuit, device, unit, or the like in reading. The hardware configuration of the base station apparatus 10 and the user equipment 20 may be configured so that each apparatus includes one or a plurality of devices represented by 1001 to 1006 illustrated in the figure and may be configured so as not to include a portion of the devices.

Each function in the base station apparatus 10 and the user equipment 20 is implemented by reading predetermined software (program) on hardware of the processor 1001, the storage device 1002, and the like allowing the processor 1001 to perform calculating, and controlling communication by the communication device 1004, reading and/or writing of data in the storage device 1002 and the auxiliary storage device 1003.

The processor 1001 controls the entire computer by operating, for example, an operating system. The processor 1001 may be configured by a central processing unit (CPU) including an interface with peripheral devices, a control device, an arithmetic device, a register, and the like.

In addition, the processor 1001 reads a program (program code), a software module, or a data from the auxiliary storage device 1003 and/or the communication device 1004 into the storage device 1002 and performs various processes in accordance with the program or the like. As the program, a program for allowing a computer to execute at least a portion of the operations described in the above embodiment is used. For example, the transmitting unit 110, the receiving unit 120, setting unit 130, and the control unit 140 of the base station apparatus 10 illustrated in FIG. 5 may be implemented by a control program that is stored in the storage device 1002 and runs on the processor 1001. In addition, for example, the transmitting unit 210, the receiving unit 220, the setting unit 230, and the control unit 240 of the user equipment 20 illustrated in FIG. 6 may be implemented by a control program that is stored in the storage device 1002 and runs on the processor 1001. Various types of processing described above have been described to be executed by one processor 1001, but various types of processing may be executed simultaneously or sequentially by two or more processors 1001. The processor 1001 may be implemented by one or more chips. In addition, the program may be transmitted from the network via a telecommunication line.

The storage device 1002 is a computer-readable recording medium and may be configured with at least one of, for example, a read only memory (ROM), an erasable programmable ROM (EPROM), an electrically erasable programmable ROM (EEPROM), and a random access memory (RAM). The storage device 1002 may be referred to as a register, a cache, a main memory (main storage device), or the like. The storage device 1002 can store a program (program codes), a software module, or the like which can be executed for performing the processing according to the embodiment of the invention.

The auxiliary storage device 1003 is a computer-readable recording medium and may be configured with at least one of, for example, an optical disk of a compact disc ROM (CD-ROM) or the like, a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above-mentioned storage medium may be, for example, a database, a server, or other suitable media including the storage device 1002 and/or the auxiliary storage device 1003.

The communication device 1004 is hardware (transmission/reception device) for performing communication between computers via a wired network and a wireless network and is also referred to as, for example, a network device, a network controller, a network card, a communication module, or the like. For example, the transmitting unit 110 and the receiving unit 120 of the base station apparatus 10 may be implemented by the communication device 1004. In addition, the transmitting unit 210 and the receiving unit 220 of the user equipment 20 may be implemented by the communication device 1004.

The input device 1005 is an input device (for example, a keyboard, a mouse, a microphone, switches, buttons, sensors, or the like) that receives an external input. The output device 1006 is an output device (for example, a display, a speaker, an LED lamp, or the like) that outputs an external output. In addition, the input device 1005 and output device 1006 may have a configuration (for example, a touch panel) in which the input device 1005 and output device 1006 are integrated.

In addition, each device, such as the processor 1001 and the storage device 1002, is connected by a bus 1007 for communicating information. The bus 1007 may be configured by a single bus or may be configured by a different bus for every device.

In addition, each of the base station apparatus 10 and the user equipment 20 may be configured to include hardware of a microprocessor, a digital signal processor (DSP), an application specific integrated circuit (ASIC), a programmable logic device (PLD), a field programmable gate array (FPGA), or the like, and a portion of or all of the functional blocks may be implemented by the hardware. For example, the processor 1001 may be implemented by at least one of these hardware processors.

Summary of Embodiment

As described above, the present embodiment provides a user equipment that includes a transmitting unit configured to transmit first data in a first step of a 2-step RACH and a receiving unit configured to receive second data in a second step of the 2-step RACH. The user equipment performs fallback to a 4-step RACH at the time of retransmission of the first data.

In addition, another aspect provides a user equipment that includes a transmitting unit configured to transmit first data in a first step of a 2-step RACH and a receiving unit configured to receive second data in a second step of the 2-step RACH. The user equipment performs fallback to a 4-step RACH according to the second data.

The above-described user equipment provides a technique capable of reducing latency by a 2-step RACH, and increasing a success rate of random access even in a bad communication environment.

Supplement to Embodiment

Heretofore, although the embodiments of the invention have been described, the disclosed invention is not limited to the embodiments, and various variations, modified examples, changed examples, alternative examples, or the like will be understood by those skilled in the art. Although the invention has been described with reference to specific numerical examples to facilitate the understanding of the invention, these values are simply illustrative, but any suitable values may be used unless otherwise noted. The divisions of items in the above description is not essential to the invention, features respectively described in two or more items may be used in combination as required, and features described with respect to a certain aspect may be applied to features described in another aspect (as long as consistency is maintained). Boundaries of the functional units or the processing units in the functional block diagram do not necessarily correspond to the boundaries of the physical components. The operations of a plurality of functional units may be performed physically by a single component, or the operations of a single functional unit may be physically performed by a plurality of components. In the processing procedure described in the embodiments, the order of the processing may be changed as long as consistency is maintained. For the sake of description convenience of the processing, although the base station apparatus 10 and the user equipment 20 has been described by using functional block diagrams, these apparatuses may be implemented in hardware, software, or a combination thereof. Each of the software operated by a processor included in the user equipment 20 according to the embodiment of the invention and the software operated by a processor included in the base station apparatus 10 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

In addition, the information indication is not limited to the aspect/embodiment described in this specification, but the information indication may be performed by using other methods. For example, the information indication may be performed by physical layer signaling (for example, downlink control information (DCI) or uplink control information (UCI)), higher layer signaling (for example, radio resource control (RRC) signaling or medium access control (MAC) signaling, broadcast information (master information block (MIB) or system information block (SIB)), other signals, or a combination thereof. In addition, the RRC signaling may be referred to as an RRC message, and the RRC message may be, for example, an RRC connection setup message, an RRC connection reconfiguration message, or the like.

Each aspect/embodiment described in this specification may be applied to at least one of long term evolution (LTE), LTE-advanced (LTE-A), SUPER 3G, IMT-advanced, 4th generation mobile communication system (4G), 5th generation mobile communication system (5G), future radio access (FRA), new radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using other suitable system, and/or a next-generation system extended based on the above-mentioned ones.

In the processing procedure, sequence, flowchart, and the like in each aspect/embodiment described in this specification, the order may be changed unless inconsistent. For example, for the method described in this specification, elements of the various steps are presented by an exemplary order, and the invention is not limited to the specific order presented.

In this specification, in some cases, a specific operation described as being performed by the base station apparatus 10 may also be performed by the upper node. In a network configured with one network node or a plurality of network nodes included in the base station apparatus 10, it is apparent that various operations performed for communication with the user equipment 20 may be performed by the base station apparatus 10 and/or network nodes (for example, MME, S-GW or the like is considered, but the network nodes are not limited thereto) other than the base station apparatus 10. A case where there is one network node other than the base station apparatus 10 is exemplified in the above description, there may be a combination of a plurality of other network nodes (for example, MME and S-GW).

Each aspect/embodiment described in this specification may be used alone, in combination, or may be switched to be used in accordance with the execution.

In some cases, the user equipment 20 may also be referred by those skilled in the art as a subscriber station, a mobile unit, a subscriber unit, a radio unit, a remote unit, a mobile device, radio device, radio communications device, a remote device, a mobile subscriber station, an access terminal, a mobile terminal, a radio terminal, a remote terminal, a handset, a user agent, a mobile client, a client, or other suitable terms.

In some cases, the base station apparatus 10 may also be referred by those skilled in the art as a node B (NB), an evolved Node B (eNB), a gNB, a base station, or other suitable terms.

In some cases, the terms "determining" and "deciding (determining)" as used in this specification may include various types of operations. The "determining" and "deciding" may include, for example, judging, calculating, computing, processing, deriving, investigating, searching (looking up) (for example, looking up in a table, searching in a database or another data structure), and checking (ascertaining) that have been considered to be "determining" or "deciding". In addition, the "determining" and "deciding" may include receiving (for example, receiving information), transmitting (for example, transmitting information), inputting, outputting, and accessing (for example, accessing data in a memory) that have been considered to be "determining" or "deciding". In addition, the "determining" and "deciding" may include resolving, selecting, choosing, establishing, and comparing that have been considered to be "determining" or "deciding". In other words, the "determining" and "deciding" may include some operations that are understood as "determining" or "deciding".

The phrase "based on" as used in this specification does not denote "based on only" unless specifically stated otherwise. In other words, the phrase "based on" denotes both "based on only" and "based on at least".

As long as the terms "include", "including", and variations thereof are used in this specification and the claims, these terms are, similar to the term "comprising", intended to be construed as inclusive. Furthermore, the term "or" as used in this specification and the claims is not intended to be exclusive OR.

Throughout the present closure, for example, in a case where articles "a", "an", and "the" in English are added in the translation, these articles may include a plurality of articles unless it clearly indicated from the context.

Heretofore, although the invention has been described in detail, it would be apparent to one skilled in the art that the invention is not limited to the embodiments described in this specification. The invention can be carried out as modified and changed modes without departing from the spirit and scope of the invention defined by the description of the claims. Accordingly, the description of this specification is intended to describe various example embodiments, and is not intended to have any restrictive meaning with respect to the invention.

Explanations of Letters or Numerals

10 BASE STATION APPARATUS
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
   a transmitter configured to transmit a preamble and a physical uplink shared channel in a first step of a 2-step random access procedure; and
   a processor configured to maintain, after switching from the 2-step random access procedure to a 4-step random access procedure, a value of a power ramping counter before the switching,
   and
   wherein the transmitter uses different values for a maximum number of transmissions in the 2-step random access procedure and a maximum number of transmissions in the 4-step random access procedure.

2. The terminal according to claim 1, wherein the processor uses different values for a power ramping step value in the 2-step random access procedure and a power ramping step value in the 4-step random access procedure.

3. The terminal according to claim 1 wherein the transmitter uses, for the preamble and the physical uplink shared channel that are transmitted in the 2-step random access procedure, a same power ramping step value, a same maximum number of transmissions, and a same transmission counter value.

4. A communication system comprising: a terminal; and a base station, wherein
   the terminal includes:
      a transmitter configured to transmit a preamble and a physical uplink shared channel in a first step of a 2-step random access procedure; and
      a processor configured to maintain, after switching from the 2-step random access procedure to a 4-step random access procedure, a value of a power ramping counter before the switching,
      and
      wherein the transmitter uses different values for a maximum number of transmissions in the 2-step random access procedure and a maximum number of transmissions in the 4-step random access procedure,
      and
   the base station includes:
      a receiver configured to receive the preamble and the physical uplink shared channel transmitted by the terminal in the first step of the 2-step random access procedure, and
      a preamble transmitted by the terminal in a first step of the 4-step random access procedure.

5. A communication method of a terminal, the communication method comprising:
   transmitting a preamble and a physical uplink shared channel in a first step of a 2-step random access procedure;
   maintaining, after switching from the 2-step random access procedure to a 4-step random access procedure, a value of a power ramping counter before the switching; and
   using different values for a maximum number of transmissions in the 2-step random access procedure and a maximum number of transmissions in the 4-step random access procedure.

6. The terminal according to claim 1, wherein the processor maintains, after the switching, a value of power after power ramping.

* * * * *